United States Patent
Lee et al.

(10) Patent No.: US 6,857,127 B2
(45) Date of Patent: Feb. 15, 2005

(54) ACTUATOR USED WITH AN OPTICAL PICKUP HAVING PLATE COILS AND MAGNETS

(75) Inventors: Jin-won Lee, Gyeonggi-do (KR); Kwang Kim, Gyeonggi-do (KR); Young-min Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 10/285,522

(22) Filed: Nov. 1, 2002

(65) Prior Publication Data

US 2003/0218962 A1 Nov. 27, 2003

(30) Foreign Application Priority Data

May 24, 2002 (KR) ........................................ 2002-28922

(51) Int. Cl.[7] ................................................ G11B 7/085
(52) U.S. Cl. ...................... 720/683; 369/44.22; 359/814
(58) Field of Search ............ 720/683; 369/44.14–44.16, 369/44.22; 859/813–814, 824; 359/813, 814, 824

(56) References Cited

U.S. PATENT DOCUMENTS

| | | | |
|---|---|---|---|
| 5,128,806 A | * | 7/1992 | Ohno ........................ 359/813 |
| 5,663,840 A | | 9/1997 | Matsui ....................... 359/814 |
| 6,344,936 B1 | * | 2/2002 | Santo et al. ................ 359/824 |
| 6,628,601 B1 | * | 9/2003 | Kobayashi .................. 369/249 |
| 6,741,543 B1 | * | 5/2004 | Suzuki et al. ............... 720/683 |

FOREIGN PATENT DOCUMENTS

| | | |
|---|---|---|
| EP | 1 098 304 A2 | 5/2001 |
| JP | 5-258326 | 10/1993 |
| JP | 8-102076 | 4/1996 |

* cited by examiner

*Primary Examiner*—Brian E. Miller
(74) *Attorney, Agent, or Firm*—Stein, McEwen & Bui, LLP

(57) ABSTRACT

An actuator used with an optical pickup to drive a blade, on which an objective lens is mounted, in focusing and tracking directions, includes a pair of magnets installed on a base, and a plate coil installed in the blade to be placed between the magnets. Each magnet has a shape in which N and S poles of the magnet are alternately magnetized in four regions asymmetrically split vertically and horizontally. In this structure, the actuator used with an optical pickup can be less affected by sensitivity variations when the blade is displaced, and the size of the electromagnetic driving unit can be reduced by reducing the number of magnetized gaps formed in the magnet.

7 Claims, 17 Drawing Sheets

ACTUATOR USED WITH AN OPTICAL PICKUP HAVING PLATE COILS AND MAGNETS

CROSS-REFERENCE TO RELATED APPLICATIONS

This application is based upon and claims priority from Korean Patent Application No. 02-28922 filed May 24, 2002 in the Korean Intellectual Property Office, the contents of which are incorporated herein by reference.

BACKGROUND OF THE INVENTION

1. Field of the Invention

The present invention relates to an actuator used with an optical pickup, and more particularly, to an actuator used with an optical pickup using plate coils.

2. Description of the Related Art

In general, optical pickups record information by irradiating light toward a disc as a recording medium through an objective lens, or reproduce information by receiving light that is reflected from the disc. Optical pickups include an actuator which adjusts the position of the objective lens such that light is irradiated to a precise position of the disc.

FIG. 1 illustrates the structure of a conventional actuator used with an optical pickup. Referring to FIG. 1, the actuator used with an optical pickup includes a blade 2 on which an objective lens 1 is mounted, a plurality of wires 7 which support the blade 2 in order to enable the blade 2 to move toward a holder 3, a pair of magnets 5 which are installed on a base 4 as an electromagnetic drive unit which drives the blade 2 in a focusing direction Z and a tracking direction X and adjusts the position of the objective lens 1, and a plate coil 6 which is installed on the blade 2 to be arranged between the pair of magnets 5.

As illustrated in FIG. 2, a plurality of pattern coils 6a and 6b are formed in the plate coil 6. Thus, if current flows through the plurality of pattern coils 6a and 6b, an electromagnetic force caused by interaction with the magnets 5 is generated, and thus the blade 2 is driven. Reference numerals 6a and 6b denote a focusing coil and a tracking coil, respectively. In the prior art, a winding coil wound in a predetermined position of the blade 2 instead of the plate coils 6a and 6b may be employed, but the plate coil 6 is preferred to reduce the size of optical pickups.

As illustrated in FIGS. 2 and 3, one side of each magnet 5 is polarized into several portions. Since the pattern coils 6a and 6b to focus and track are placed on one plane due to the structural characteristics of the plate coil 6, each magnet 5 is formed in a polarized structure as in FIGS. 2 and 3, so as to form magnetic force lines corresponding to each of the pattern coils 6a and 6b.

If one side of each magnet 5 is polarized into several portions, a magnetized gap G exists between the poles of each of the magnets 5. The magnetized gap G generally has the width W of about 0.2–1.2 mm. However, since the size of a slim type magnet is only 3.5–4 mm while the size of a half-height type magnet is only 5–7 mm, the width W of the magnetized gap G cannot be ignored. In particular, as illustrated in FIGS. 2 and 3, in a structure where the magnetized gap G is formed in three places in a horizontal direction and in two places in a vertical direction, the sum of the width W of the magnetized gap G affects more of the area of each of the magnets 5. Furthermore, if polarization becomes more active, the effective magnet area required to generate an electromagnetic force is reduced, and thus sensitivity is lowered.

Thus, actuators used with optical pickups which can minimize the amount of polarization of a magnet and prevent a decrease in actuator sensitivity are necessary.

SUMMARY OF THE INVENTION

Accordingly, it is an object of the present invention to provide an actuator used with an optical pickup which can prevent a decrease in actuator sensitivity and reduce the size of the optical pickup by reducing the amount of polarization of a magnet.

Additional objects and advantages of the invention will be set forth in part in the description which follows and, in part, will be obvious from the description, or may be learned by practice of the invention.

The foregoing and other objects of the present invention are achieved by providing an actuator used with an optical pickup to drive a blade, on which an objective lens is mounted, in focusing and tracking directions. The actuator includes a pair of magnets installed on a base, and a plate coil installed in the blade to be placed between the magnets.

Each magnet has a shape in which N and S poles of the magnet are alternately magnetized in four regions asymmetrically split vertically and horizontally.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Figure 1:
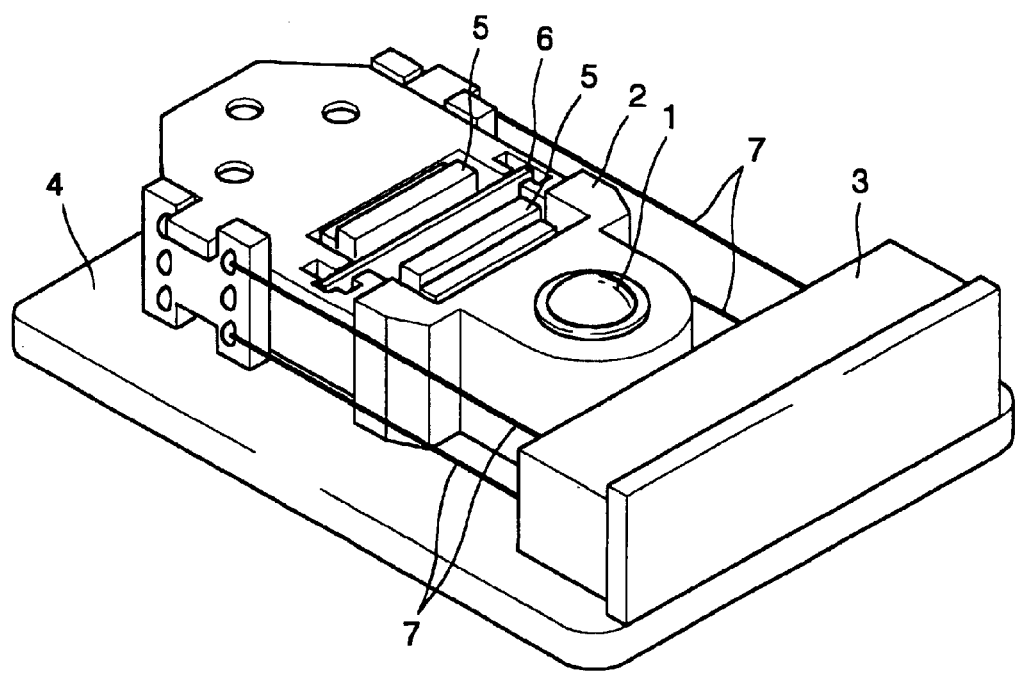
FIG. 1 illustrates a conventional actuator used with an optical pickup.
Figure 1:
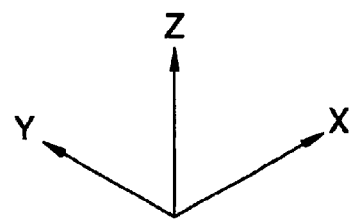

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 4:
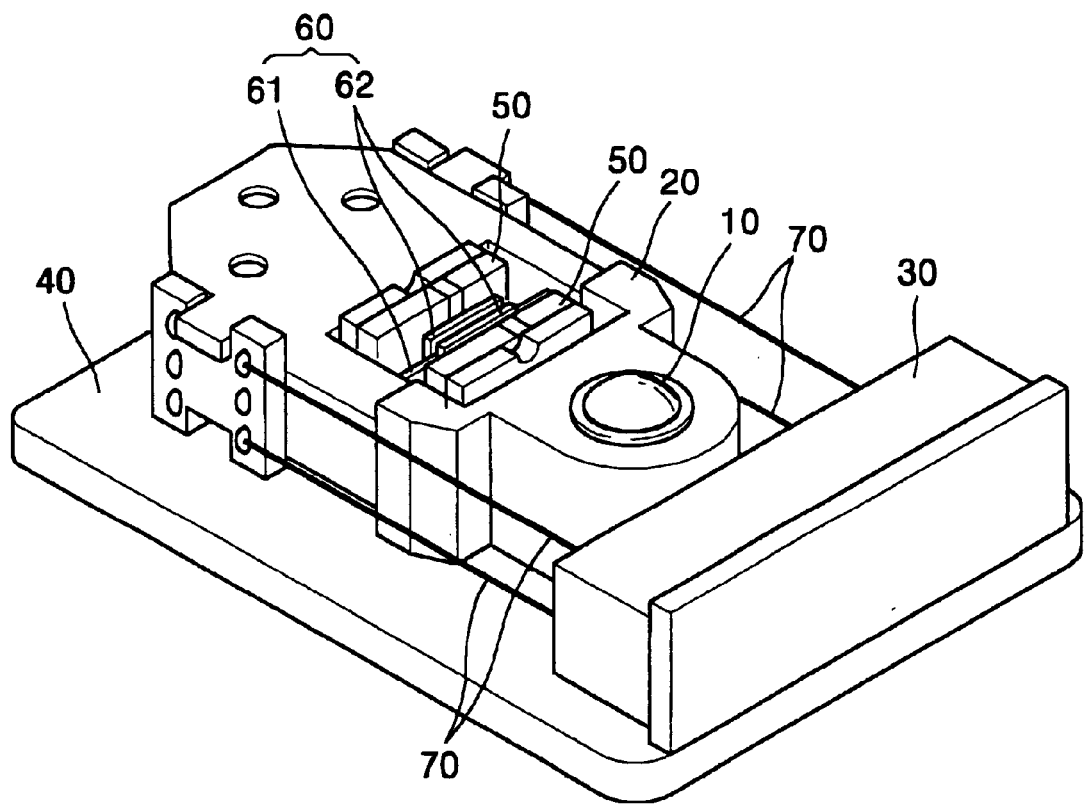
FIG. 4 illustrates an actuator used with an optical pickup according to an embodiment of the present invention.

FIG. 4 illustrates the structure of an actuator used with an optical pickup according to an embodiment of the present invention. Referring to FIG. 4, a holder 30 is placed on a base 40, and a blade or lens mount 20 on which an objective lens 10 is mounted, is supported by a plurality of wires 70 in order to enable the blade or lens mount 20 to move relative to the holder 30. Also provided is an electromagnetic driving unit which drives the blade or lens mount 20 in a focusing direction Z and in a tracking direction X and controls the position of the objective lens 10. The electromagnetic driving unit includes a pair of magnets 50 that are installed to be opposite to the base 40, and a plate coil 60 that is installed in the blade or lens mount 20 to be placed between the magnets of the pair of magnets 50.

Figure 5:
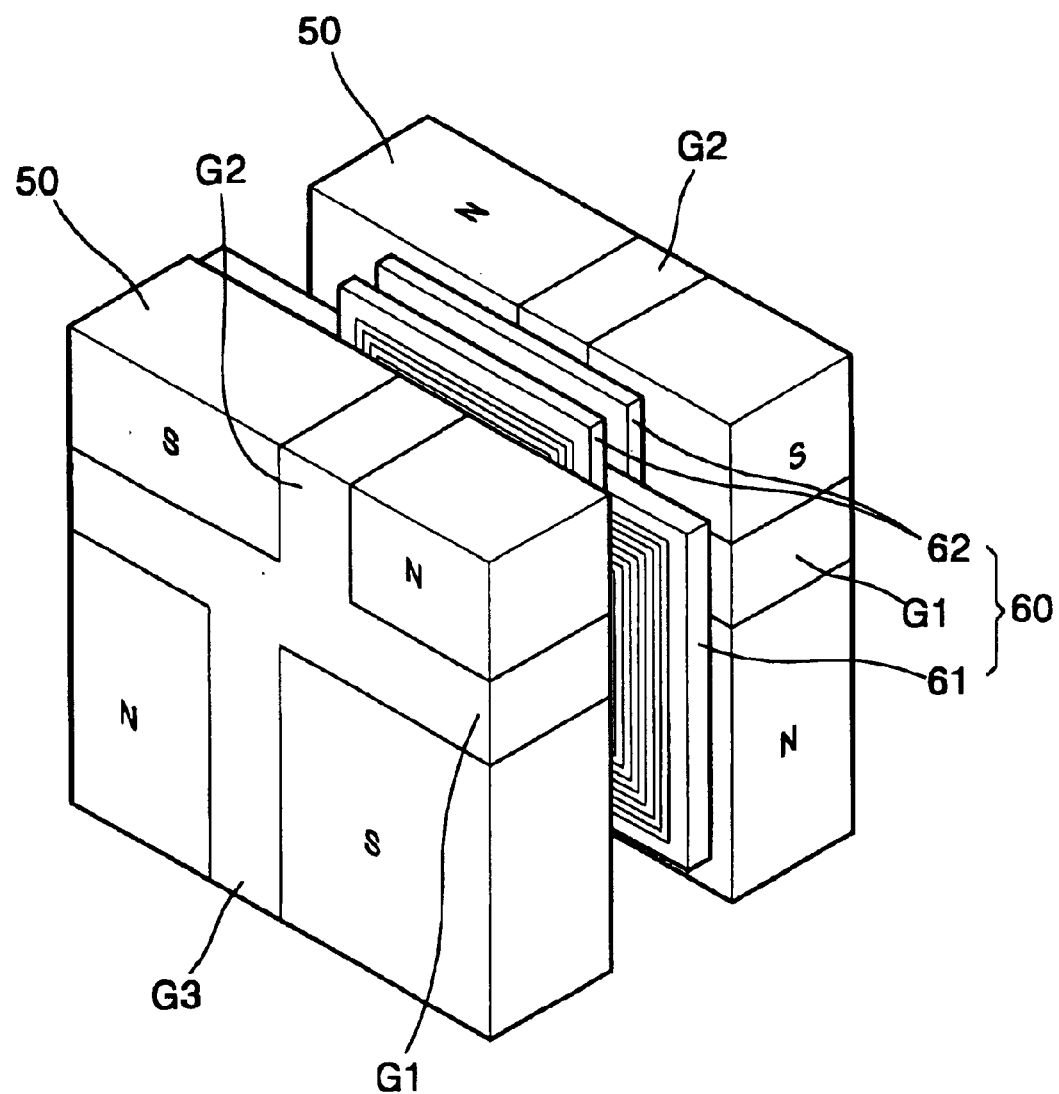
FIG. 5 illustrates an electromagnetic driving unit of the actuator used with the optical pickup illustrated in FIG. 4.

As illustrated in FIG. 5, each magnet of the pair of magnets 50 has a shape in which N and S poles of the magnet 50 are alternately magnetized in four regions asymmetrically split vertically and horizontally. Namely, each magnet of the pair of magnets 50 is split into upper and lower portions by a horizontal magnetized gap G1, and the horizontal magnetized gap G1 has a shape in which upper and lower portions are split while passing through a portion of each magnet of the pair of magnets 50 higher than the center thereof. Thus, the upper and lower portions of the magnets are asymmetrically split into two portions. Likewise, the upper portion of the two portions split up and down by the horizontal magnetized gap G1 is again split into two portions by a first vertical magnetized gap G2. The first vertical magnetized gap G2 is asymmetrically split between a right side and a left side, but more toward the right side of FIG. 5 from the center of each magnet of the pair of magnets 50. Also, the lower portion of the magnets is split right and left by a second vertical magnetized gap G3. The second vertical magnetized gap G3 is asymmetrically split between a right side and a left side, but more toward the left side of FIG. 5 from the center of each magnet of the pair of magnets 50. N and S poles of each magnet of the pair of magnets 50 are alternatively magnetized in the four-split portions. Of course, an opposite pole is arranged at the opposite side of each magnet of the pair of magnets 50 so as to generate an attractive force.

Figure 6:
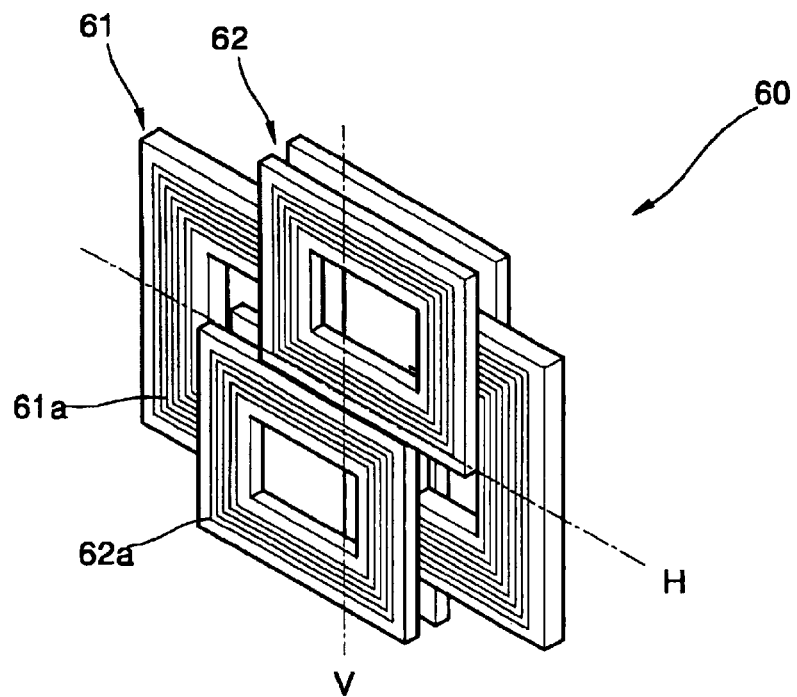
FIG. 6 illustrates a plate coil of the electromagnetic driving unit illustrated in FIG. 5.

The plate coil 60 is placed between the magnets of the pair of magnets 50 that are asymmetrically four-split and magnetized. Referring to FIG. 6, the plate coil 60 includes a focusing substrate 61 on which a focusing coil 61a is formed, and a tracking substrate 62 on which a tracking coil 62a is formed. The focusing coil 61a of the focusing substrate 61 is formed of a pair of closed loops that are arranged symmetrically with respect to a vertical line V. The tracking coil 62a of the tracking substrate 62 is formed of a pair of closed loops that are arranged up and down with respect to a horizontal line H passing through the center of the focusing coil 61a, and arranged symmetrically with respect to the vertical line V. The tracking substrate 62 is attached to front and back sides of the focusing substrate 61, respectively, in the same form.

Figure 7:
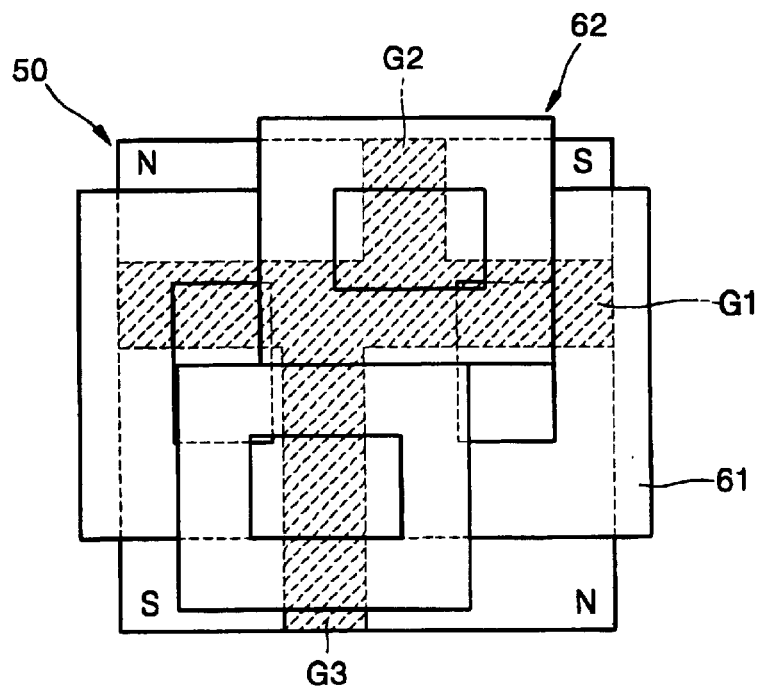
FIG. 7 illustrates correlation of an initial position between the plate coil and a magnet of the electromagnetic driving unit illustrated in FIG. 5.

Initial relative positions of each magnet of the pair of magnets 50 and the plate coil 60 are as illustrated in FIG. 7. In this state, if position control of the objective lens 10 is performed, current flows through the plate coil 60, and thus the blade 20 moves. Here, the plate coil 60 is fixed in the blade 20. The movement of the blade 20 with respect to the position of the plate coil 60 will be described below.

Figure 2:
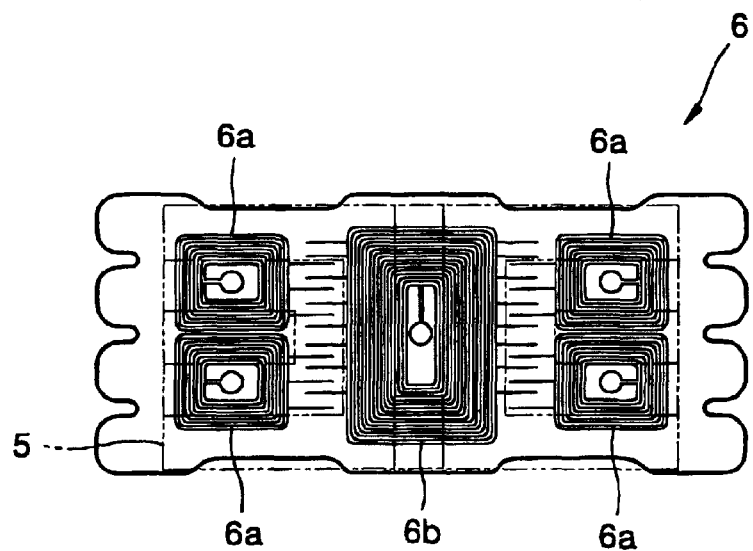
FIG. 2 illustrates an electromagnetic driving unit of the actuator used with an optical pickup illustrated in FIG. 1.
Figure 3:
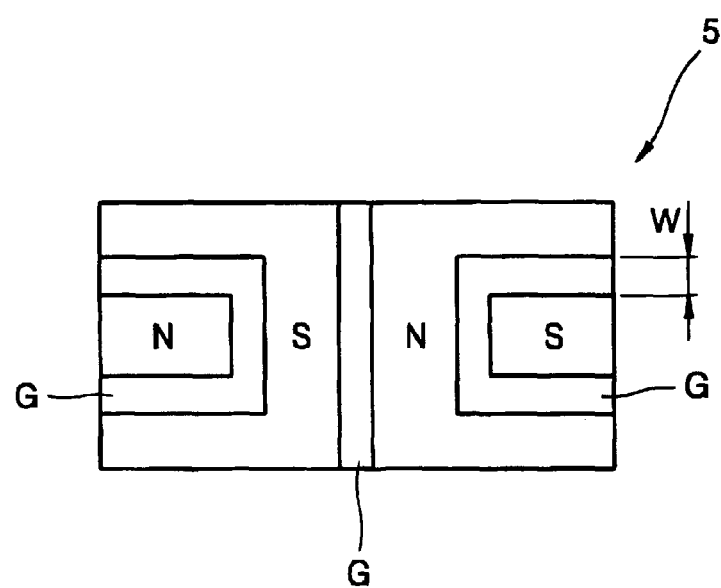
FIG. 3 illustrates magnets of the electromagnetic driving unit illustrated in FIG. 2.
Figure 8A:
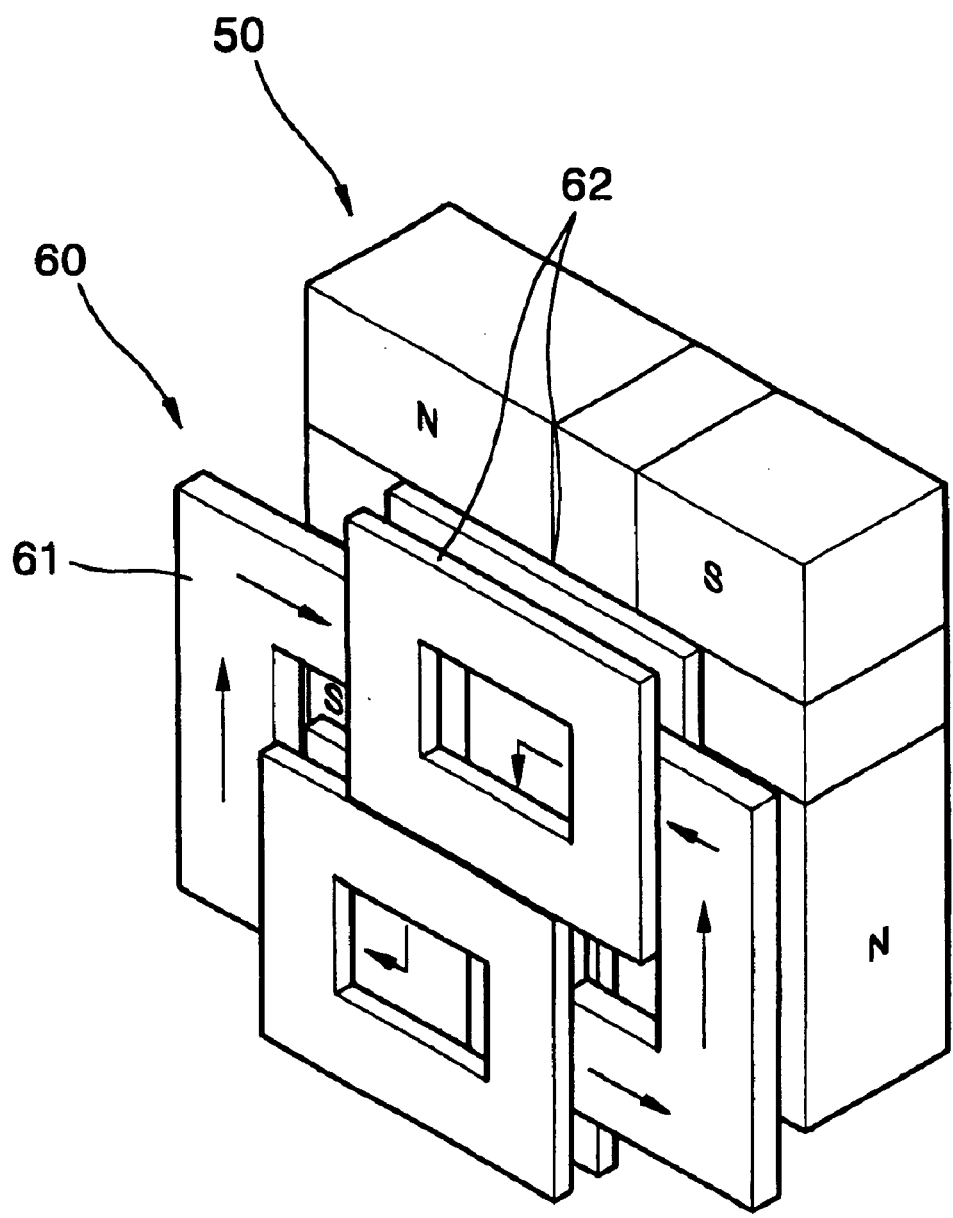
FIGS. 8A through 11B illustrate position variations between the plate coil and a magnet of the electromagnetic caused by the control from the initial position illustrated in FIG. 7.
Figure 8B:
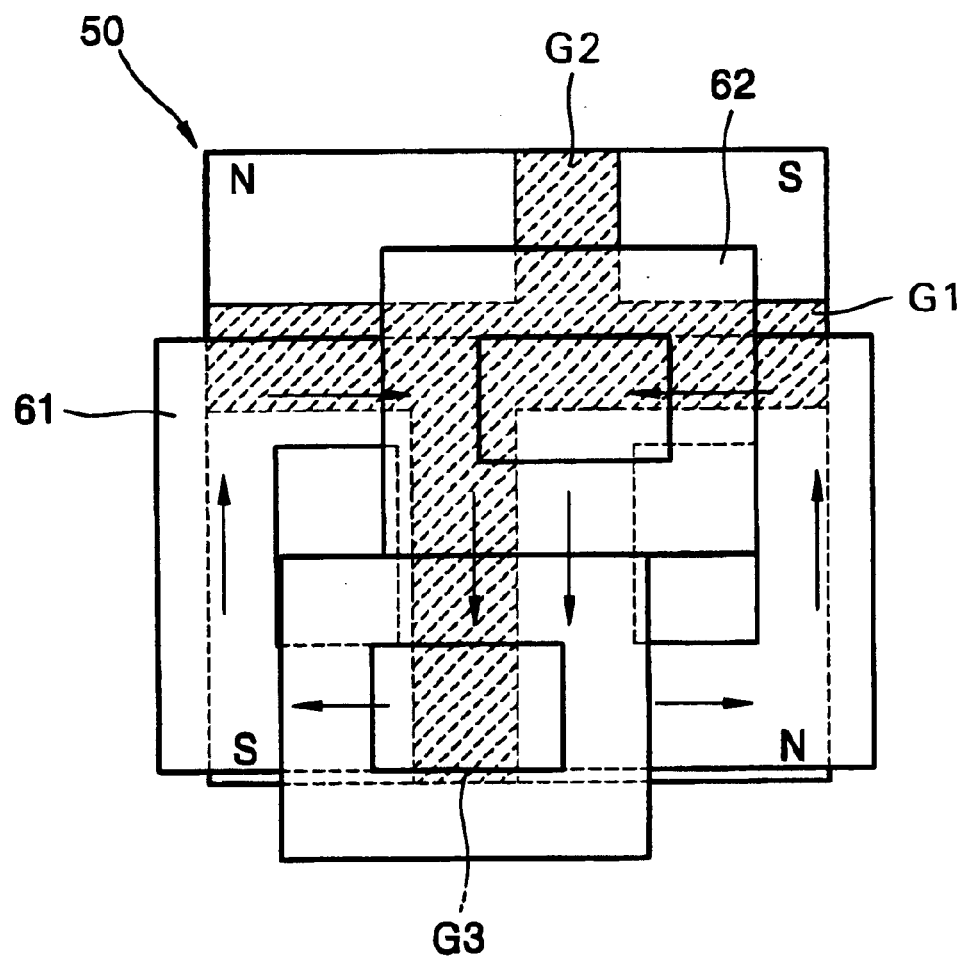
Figure 9A:
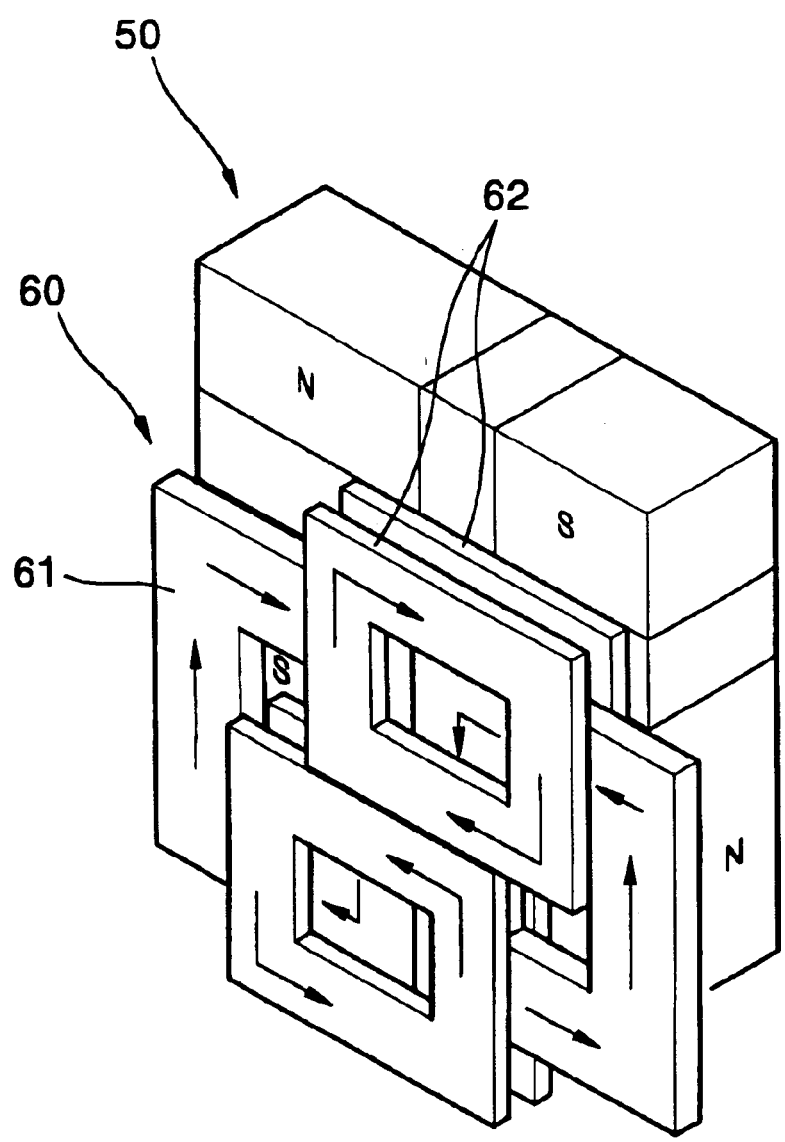
Figure 9B:
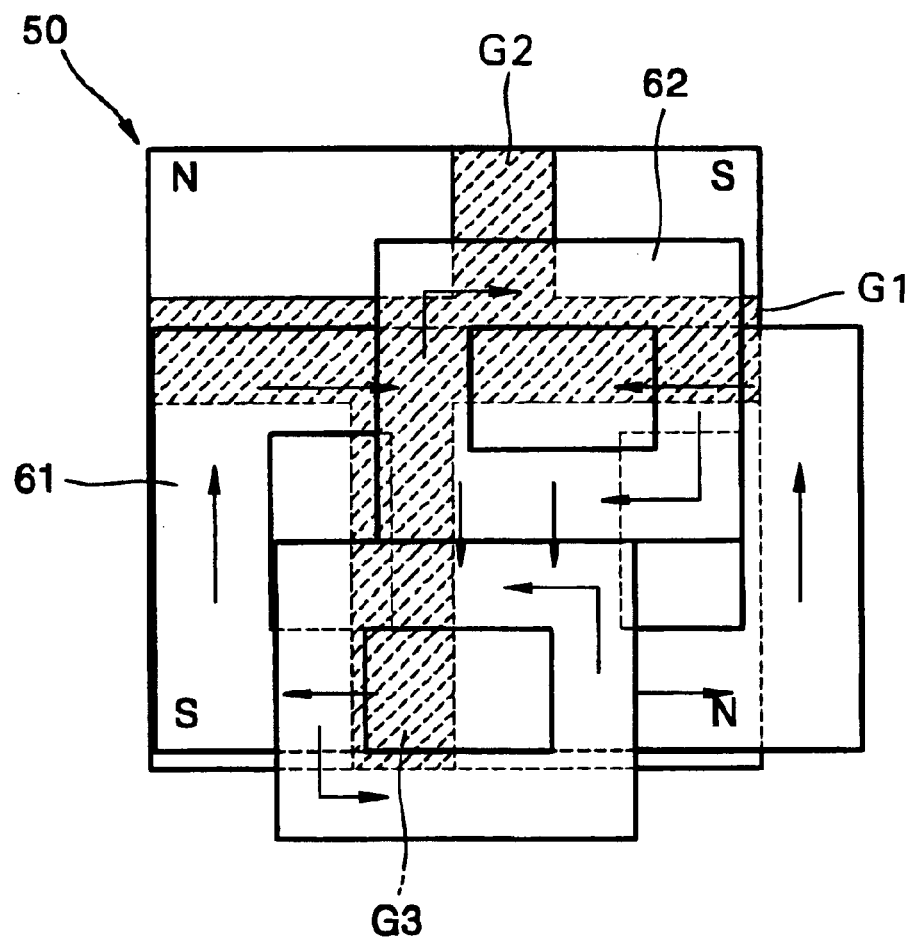

FIGS. 8A and 8B illustrate the relative positions of each magnet of the pair of magnets 50 and the plate coil 60 when focusing control is performed downward, and thus, when the blade 20 descends in the lowest position. FIGS. 9A and 9B illustrate the case where tracking control is performed in the descended state as in FIG. 8A, and thus, when the blade 20 moves to a right limit. According to the present invention, there are only the first and second vertical magnetized gaps G2 and G3 in a vertical direction, and thus the effective area of the magnet is relatively large compared to the structure of the prior art as illustrated in FIGS. 1 to 3. Even if it seems that a two-stage gap is formed by the first and second vertical magnetized gaps G2 and G3, this is actually the same as a one-stage gap since the first and second vertical magnetized gaps G2 and G3 are alternately arranged to provide asymmetrical division. Thus, a larger effective area of the magnets of the present invention can be obtained than that of the prior art. This is in close relation with the sensitivity increase of the actuator used with an optical pickup. As illustrated in FIGS. 8A through 9B, even though focusing control and tracking control are simultaneously performed, and thus the blade 20 moves to an extreme position, the effective area of each magnet of the pair of magnets 50 which faces the plate coil 60 can be effectively maintained.

Figure 10A:
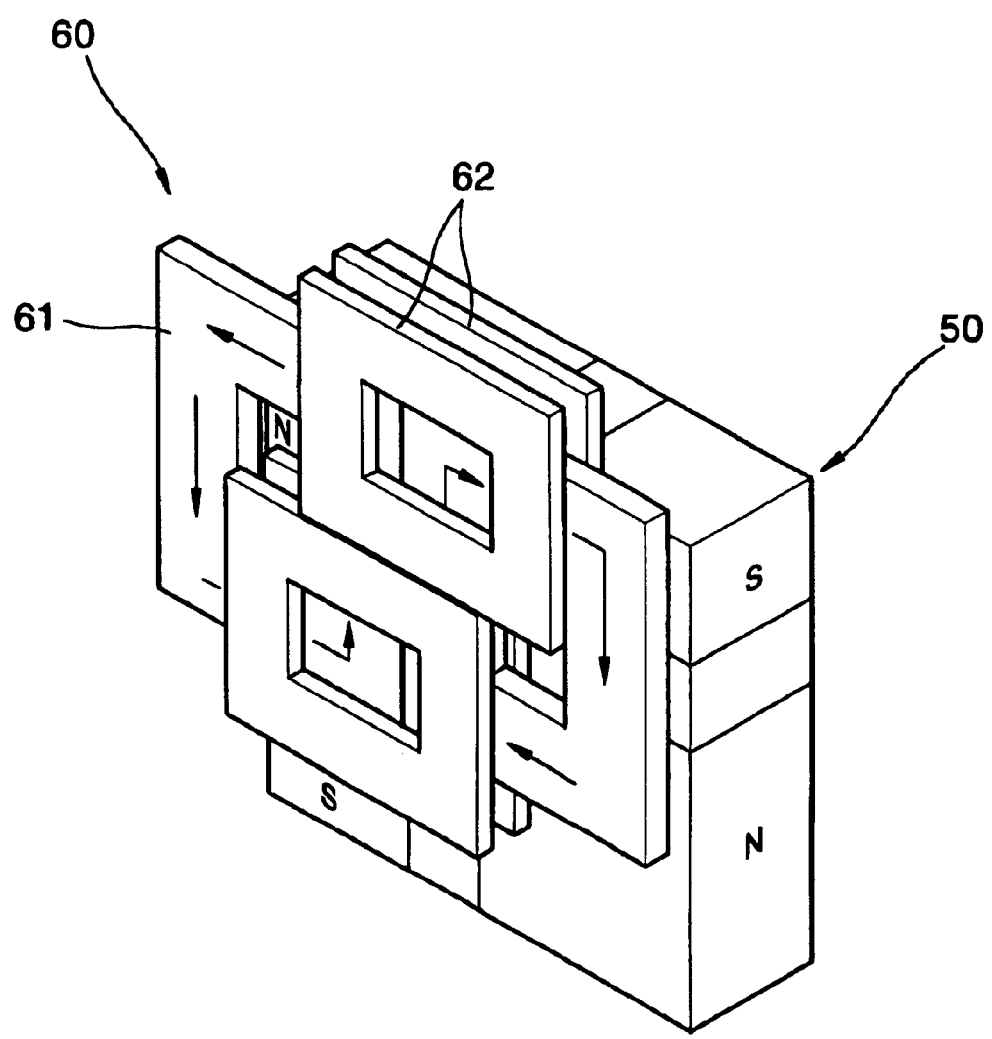
Figure 10B:
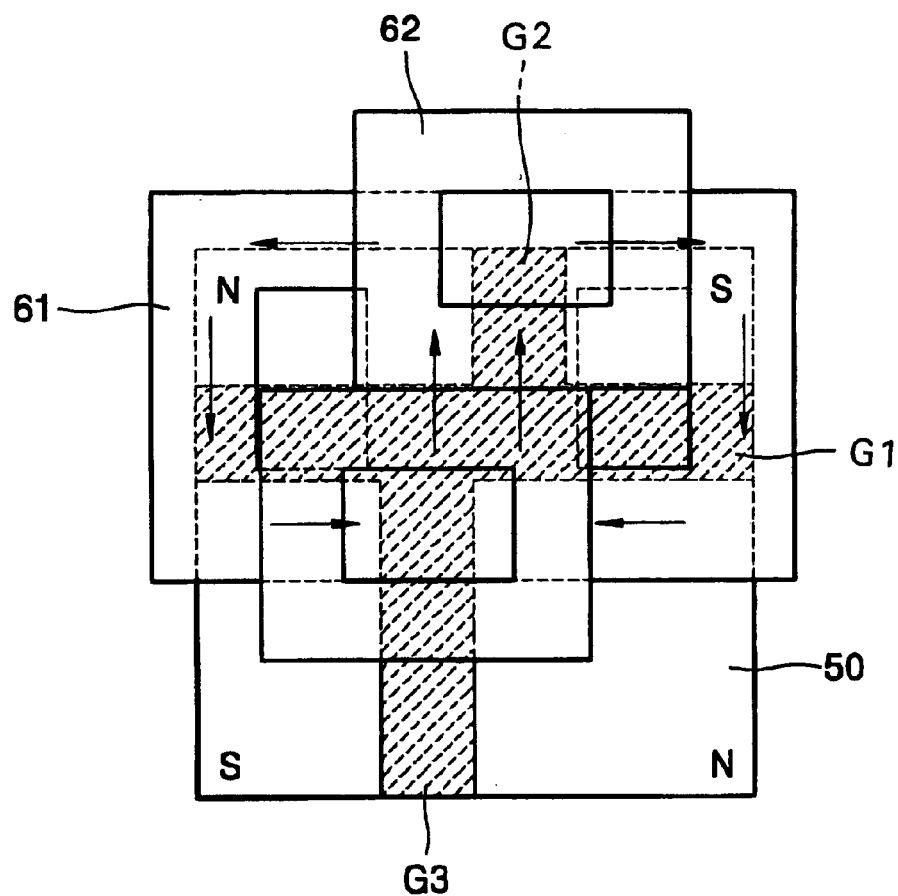
Figure 11A:
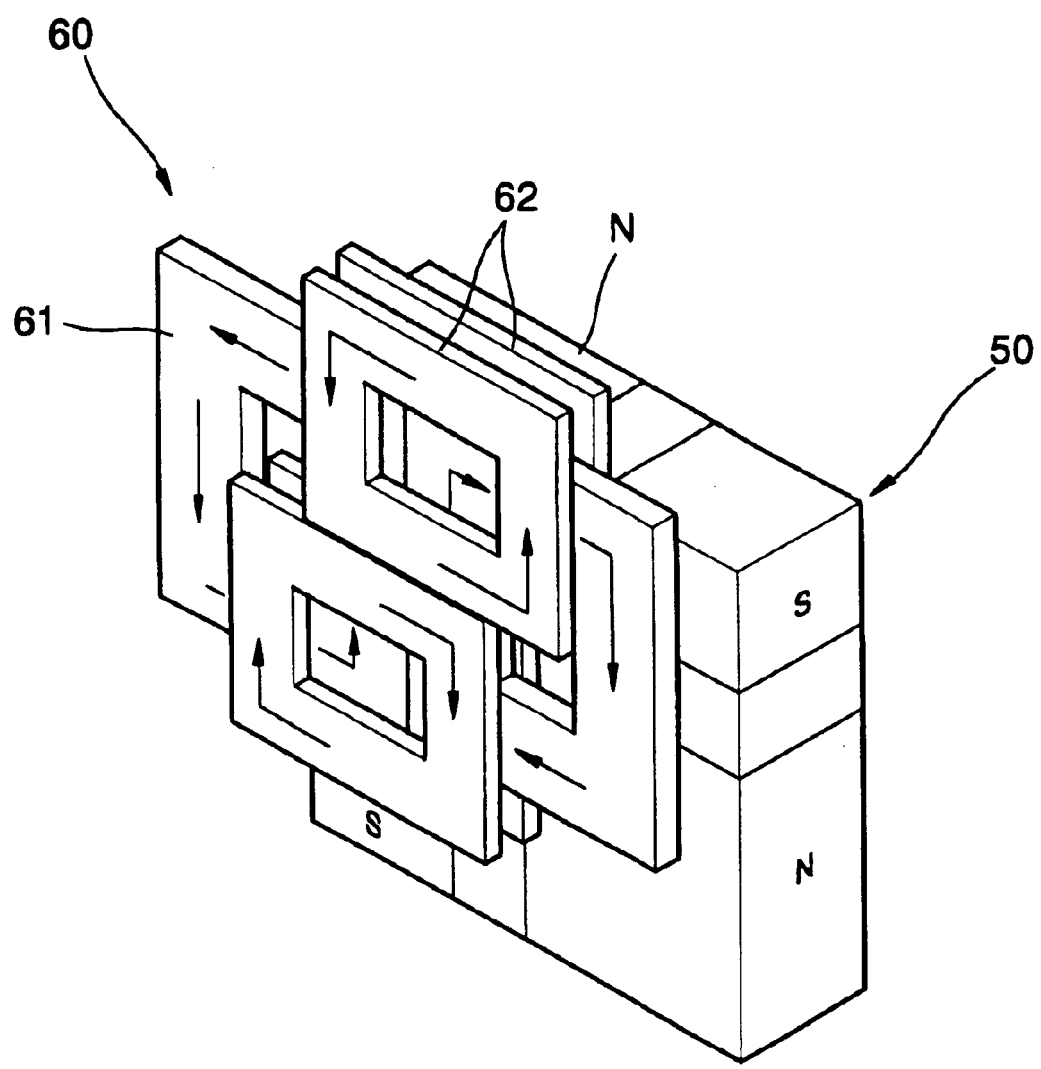
Figure 11B:
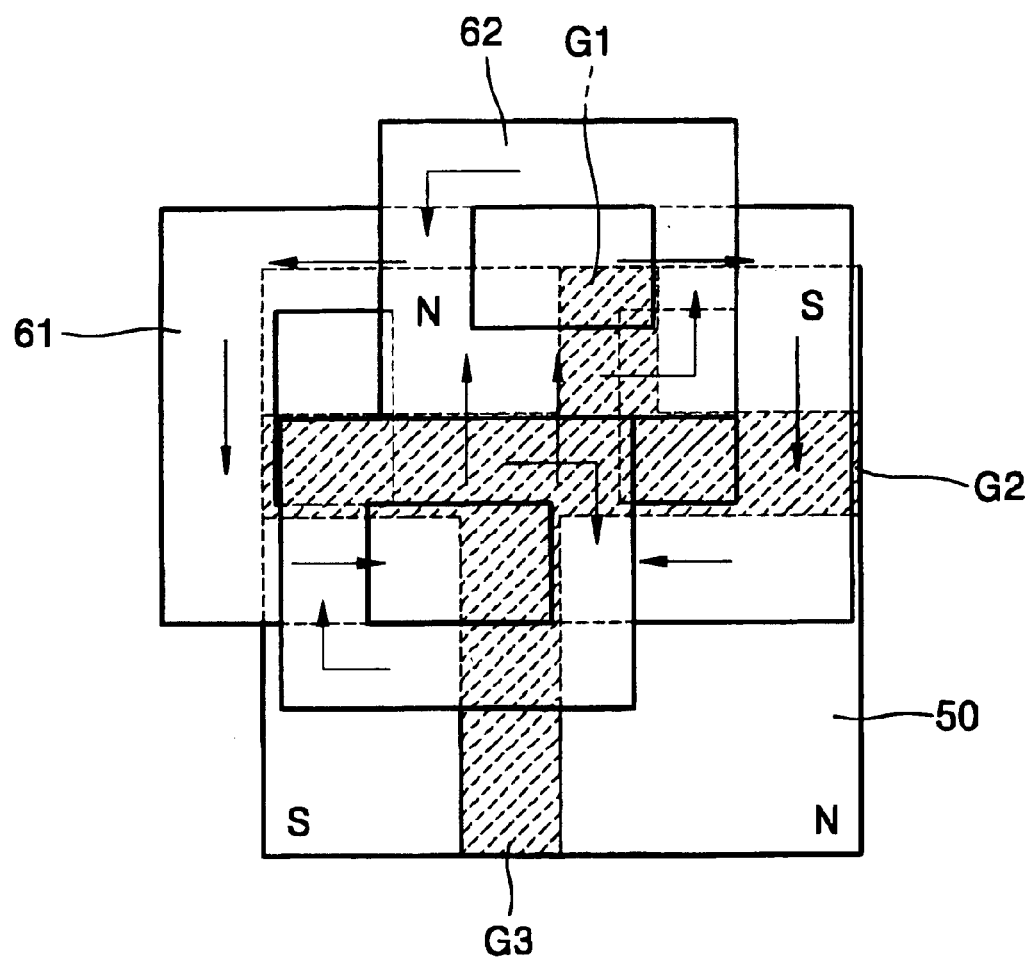

Conversely, FIGS. 10A and 10B illustrate the relative positions of each magnet of the pair of magnets 50 and the plate coil 60 when focusing control is performed upward, and thus, when the blade 20 ascends in the highest position. FIGS. 11A and 11B illustrate the case where tracking control is performed in the ascended state as in FIG. 1A, and thus, when the blade 20 moves to a left limit. Similarly, even though the blade 20 moves to the extreme position, the effective area between the plate coil 60 and each magnet of the pair of magnets 50 that are used to provide tracking control can be effectively maintained.

If the effective area is maintained by each magnet of the pair of magnets 50 that is asymmetrically magnetized and the plate coil 60 corresponding to each magnet of the pair of magnets 50, the sensitivity of the actuator used with an optical pickup can be increased. If the sensitivity of the actuator used with an optical pickup is high, a higher force to move the blade 20 can be obtained in the case of the same current supplied. FIGS. 12 through 15 are graphs comparing sensitivity variations of the prior art caused by the displacement of the actuator for an optical pickup with those of the present invention, respectively. Maximums of the graphs represent the sensitivity in an initial state where focusing or tracking control is not performed, i.e., maximum forces which affect the actuator used with an optical pickup in the case of the same current supplied. In this case, the effective area where magnetized portions of the focusing coil 61a, the tracking coil 62a, and the magnets of the pair of magnets 50 face one another is the largest, the largest sensitivity of the actuator used with an optical pickup can be obtained. If the blade 20 moves in the focusing direction Z or the tracking direction X from the highest points, the effective area is reduced gradually, and thus the sensitivity of the actuator used with an optical pickup is reduced gradually.

Figure 12:
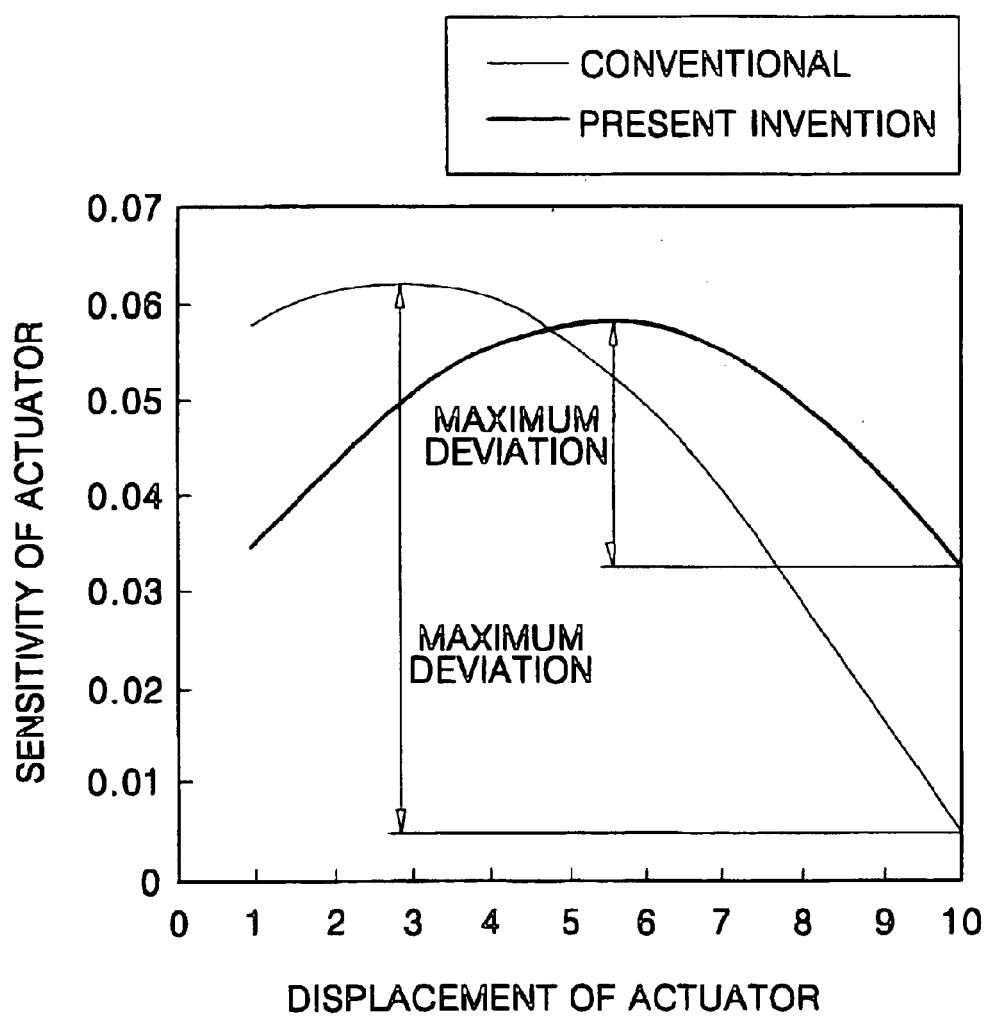
FIGS. 12 through 15 are graphs comparing sensitivity variations of the prior art caused by the displacement of the actuator used with an optical pickup with those of the present invention, respectively.

FIG. 12 illustrates sensitivity variations in the focusing direction caused by the displacement of the actuator in the focusing direction. It can be understood from FIG. 12 that a deviation between a maximum value and a minimum value is reduced greatly in the structure of the present invention, as compared with a conventional structure. That is, the sensitivity in the initial state in a conventional structure is similar to the sensitivity in the initial state in the structure according to the present invention, but the sensitivity in the initial state in a conventional structure is rapidly reduced when focusing control begins, and thus the displacement of the blade 20 increases. However, the lowering of the sensitivity is not severe in the structure according to the present invention, and thus a sensitivity like that in the initial state can be maintained.

Figure 13:
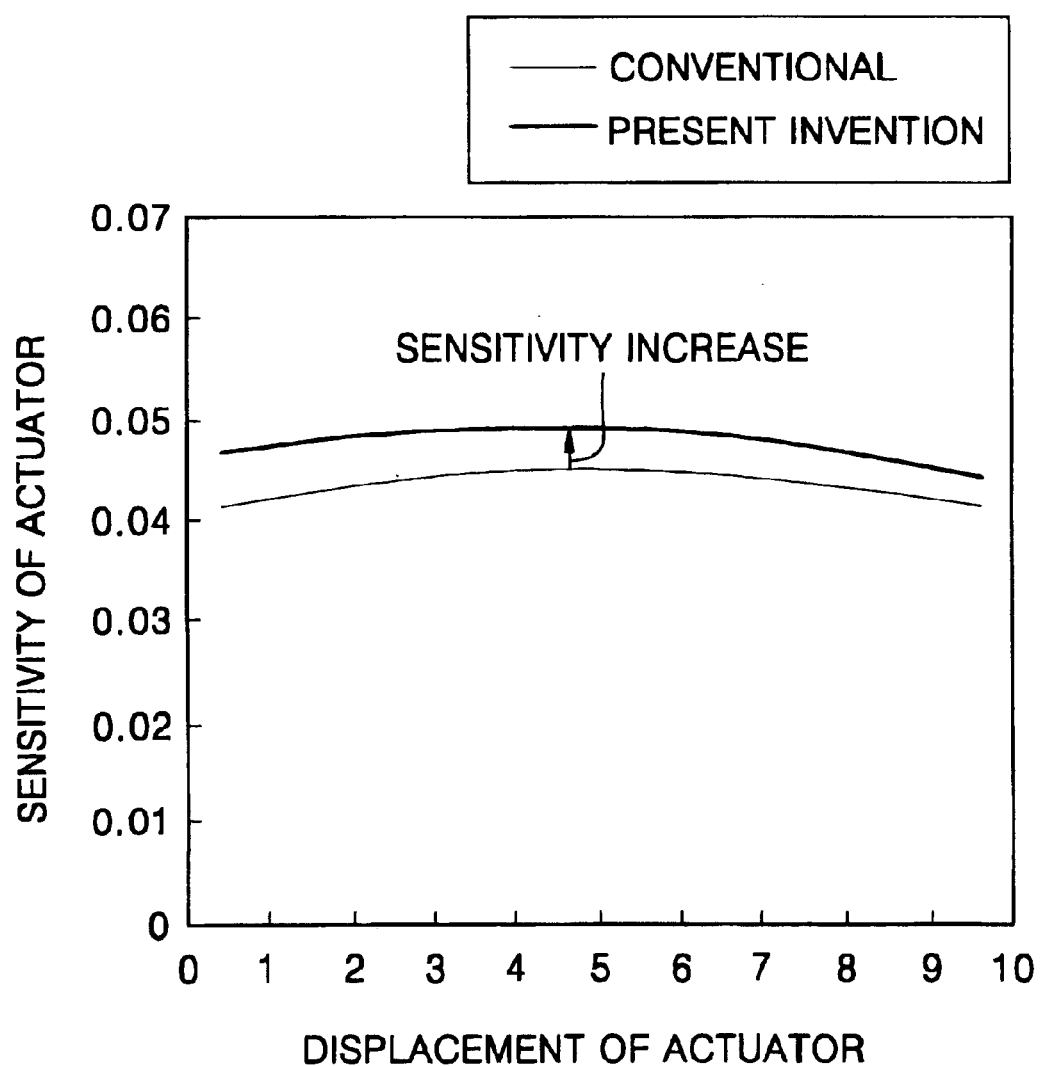

FIG. 13 illustrates sensitivity variations in the focusing direction caused by the displacement of the actuator in the tracking direction. It can be understood from FIG. 13 that the sensitivity of the actuator used with an optical pickup according to the present invention is higher than compared with the sensitivity of a conventional actuator used with an optical pickup.

Figure 14:
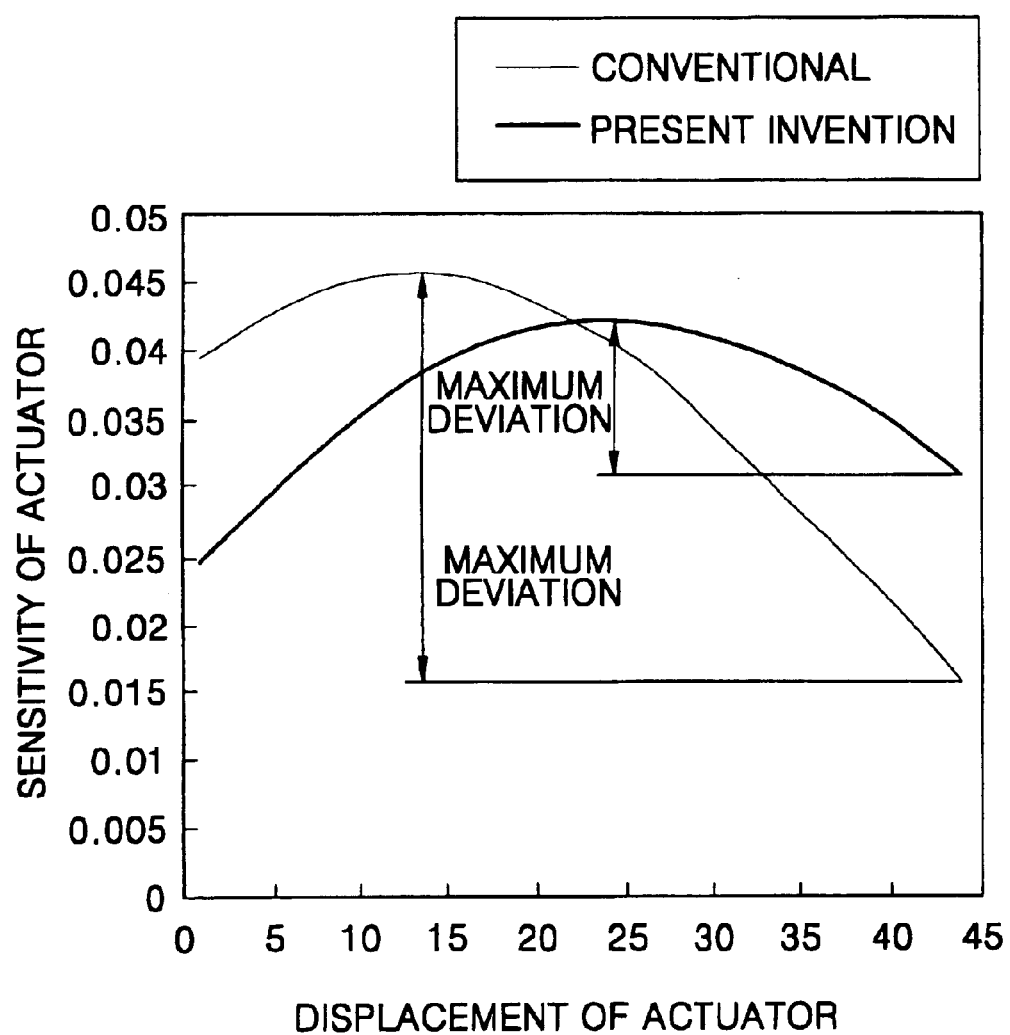

FIG. 14 illustrates sensitivity variations in the tracking direction caused by the displacement of the actuator in the focusing direction. Similarly, it can be understood from FIG. 14 that the deviation between the maximum value and the minimum value is reduced more than compared with the deviation of the conventional actuator used with an optical pickup.

Figure 15:
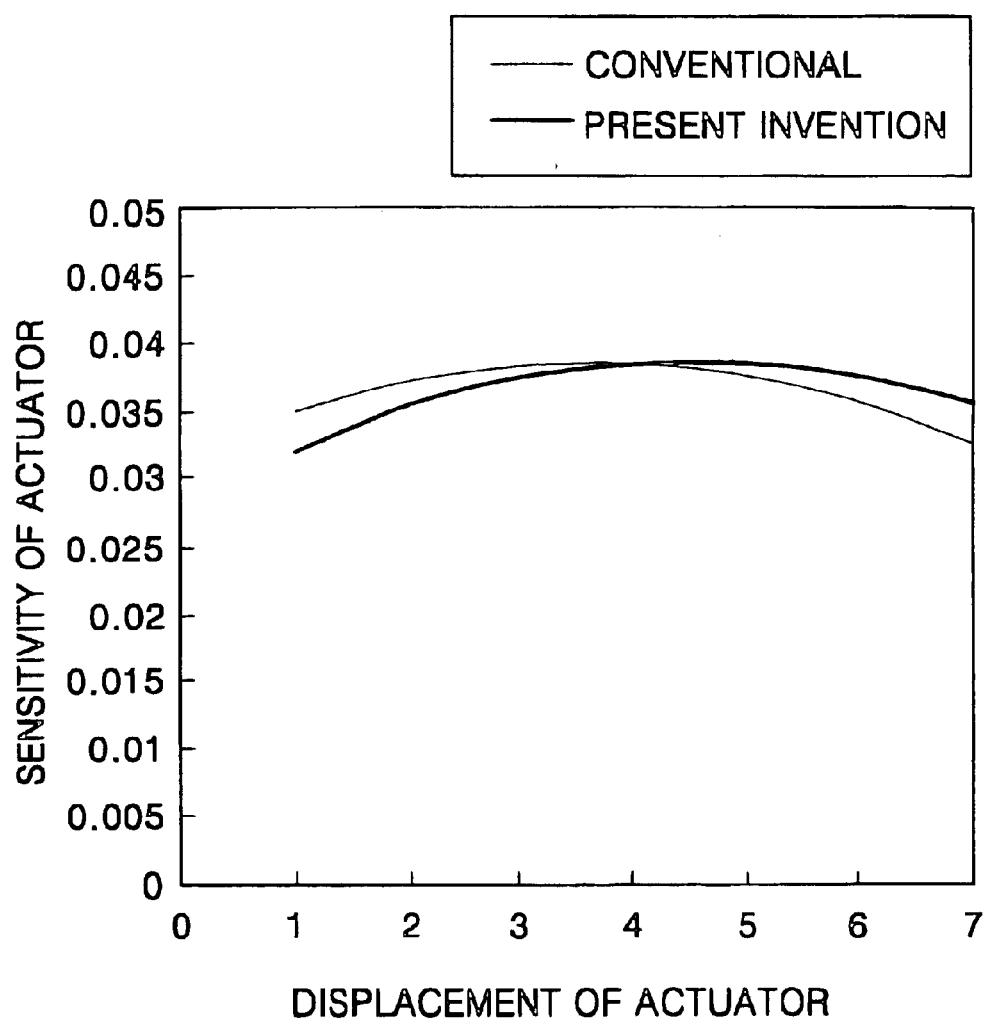

FIG. 15 illustrates sensitivity variations in the tracking direction caused by the displacement of the actuator in the tracking direction. It can be understood from FIG. 15 that the conventional actuator used with an optical pickup and the actuator used with an optical pickup according to the present invention show similar sensitivity.

Hence, it can be understood that the actuator used with an optical pickup according to the preset invention is less affected by sensitivity variations caused by the movement of the blade 20 compared with that of the conventional actuator used with an optical pickup. This is because the effective area between the plate coil 60 and the magnet 50 is properly maintained even though the blade 20 is displaced. Consequently, the actuator used with an optical pickup according to the present invention can reduce the size of the electromagnetic driving unit by reducing the number of magnetized gaps that are formed on each magnet of the pair of magnets 50, while being less affected by sensitivity variations when the blade 20 moves.

As described above, the actuator used with an optical pickup according to the present invention has the following advantages.

First, since the number of magnetized gaps formed on one magnet is reduced in horizontal and vertical directions, the entire actuator used with an optical pickup can be made slim by reducing the size of the electromagnetic driving unit.

Second, sensitivity variations caused by the displacement of the blade can be reduced during focusing and tracking control, and thus the reliability of control is increased.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An actuator used with an optical pickup to drive a lens mount, mounted on a base, in focusing tracking directions, the actuator comprising:
    a pair of magnets installed on the base; and
    a plate coil installed on the lens mount and placed between the magnets;
    wherein each magnet has a shape in which N and S poles of the magnet are alternately magnetized in four regions asymmetrically split vertically and horizontally.

2. The actuator of claim 1, wherein the plate coil includes:
    a focusing substrate on which a focusing coil is formed; and
    a tracking substrate attached to the focusing substrate, on which a tracking coil is formed.

3. The actuator of claim 2, wherein the focusing coil is formed of a pair of closed loops that are arranged symmetrically with respect to a vertical line, and the tracking coil is formed of a pair of closed loops that are arranged up and down with respect to a horizontal line passing through the center of the focusing coil and arranged symmetrically with respect to the vertical line.

4. The actuator of claim 1, wherein a magnetized gap forming a boundary between the four regions of the magnet comprises:
    a horizontal magnetized gap which passes the magnet in a horizontal direction and splits the magnet into two portions up and down;
    a first vertical magnetized gap which splits the magnet asymmetrically with respect to a vertical line at the upper portion of the horizontal magnetized gap; and
    a second vertical magnetized gap which splits the magnet asymmetrically in a right and left ratio opposite to that of the first vertical magnetized gap at the lower portion of the horizontal magnetized gap.

5. The actuator of claim 2, wherein the tracking substrate is attached to opposing sides of the focusing substrate.

6. The actuator of claim 1, wherein opposite poles are arranged at the opposite side of each magnet to generate an attractive force.

7. An actuator used with an optical pickup to drive a lens mount, mounted on a base, in focusing and tracking directions, the actuator comprising:
    a pair of magnets installed on the base, each magnet having a shape in which N and S poles of each magnet are alternately magnetized in plural asymmetrically split regions; and
    a plate coil installed on the lens mount and placed between the magnets.

* * * * *